(12) United States Patent  
Sato

(10) Patent No.: US 7,295,333 B2  
(45) Date of Patent: Nov. 13, 2007

(54) PRINTING DEVICE WITH INSTALLABLE DATA CONVERSION FUNCTION

(75) Inventor: Tomotoshi Sato, San Jose, CA (US)

(73) Assignee: Ricoh Company, Ltd., Tokyo (JP)

( * ) Notice: Subject to any disclaimer, the term of this patent is extended or adjusted under 35 U.S.C. 154(b) by 1063 days.

(21) Appl. No.: 10/616,632

(22) Filed: Jul. 9, 2003

(65) Prior Publication Data

US 2005/0007615 A1    Jan. 13, 2005

(51) Int. Cl.  
G06K 15/00    (2006.01)

(52) U.S. Cl. .................... 358/1.13; 358/1.15

(58) Field of Classification Search .............. 358/1.15, 358/1.4, 1.6, 1.13, 468, 434, 435, 436, 437, 358/438, 439

See application file for complete search history.

(56) References Cited

U.S. PATENT DOCUMENTS

| | | | |
|---|---|---|---|
| 5,182,548 A | | 1/1993 | Haeberli |
| 5,229,814 A | | 7/1993 | Hube et al. |
| 5,303,336 A | | 4/1994 | Kageyama et al. |
| 5,353,388 A | | 10/1994 | Motoyama |
| 5,513,013 A | | 4/1996 | Kuo |
| 5,749,024 A | | 5/1998 | Young |
| 5,859,711 A | | 1/1999 | Barry et al. |
| 5,933,576 A | * | 8/1999 | Muramatsu ................. 358/1.1 |
| 6,354,752 B1 | * | 3/2002 | Nakagiri ...................... 400/76 |
| 2003/0135664 A1 | * | 7/2003 | Hayashi et al. ............. 709/321 |
| 2003/0184807 A1 | * | 10/2003 | Tsuchitoi ................... 358/1.18 |
| 2004/0205621 A1 | * | 10/2004 | Johnson et al. ............. 715/523 |
| 2005/0275851 A1 | | 12/2005 | Kim |

FOREIGN PATENT DOCUMENTS

| | | | |
|---|---|---|---|
| EP | 0478339 | * | 4/1992 |
| EP | 0478339 A1 | | 4/1992 |
| EP | 0621557 A1 | | 10/1994 |

(Continued)

OTHER PUBLICATIONS

European Patent Office, "Partial European Search Report," App. No. 05011405.7, dated Nov. 11, 2005, 4 pages.

(Continued)

*Primary Examiner*—Jerome Grant, II  
(74) *Attorney, Agent, or Firm*—Christian A. Nicholes; Hickman Palermo Troung & Becker LLP

(57) ABSTRACT

A printing device into which data conversion functionality may be installed is disclosed. According to one aspect, the printing device receives, through a first module, a command that is intended to cause the printing device to perform an action that is indicated by the command. The printing device determines whether a translation module, which contains logic for translating the command, is installed in the printing device. If the translation module is not installed in the printing device, then the printing device sends data, which indicates the command, directly from the first module to a second module. If the translation module is installed in the printing device, then the printing device invokes the logic to translate the command into one or more translated commands that will cause the printing device to perform the intended action, and sends the one or more translated commands to the second module.

23 Claims, 4 Drawing Sheets

FOREIGN PATENT DOCUMENTS

| | | | |
|---|---|---|---|
| EP | 0658856 | * | 6/1995 |
| EP | 0658856 A2 | | 6/1995 |
| EP | 0809206 A2 | | 11/1997 |
| JP | 408138007 | * | 5/1996 |

OTHER PUBLICATIONS

U.S. Appl. No. 10/857,693, filed May 28, 2004.
Ricoh Corporation, "The Ricoh Aficio Color 6513, Creative Color Series," undated, http://www.ricoh-usa.com//productshowroom/colordigitalimaging/aficio6513/aficio6513.pdf, 4 pages.

* cited by examiner

PRINTING DEVICE WITH INSTALLABLE DATA CONVERSION FUNCTION

FIELD OF THE INVENTION

The invention relates to printing devices, and more specifically, to a printing device in which data conversion functionality may be installed.

BACKGROUND OF THE INVENTION

Printing devices, such as printers, copy machines, and multi-function peripherals (MFPs) such as the Ricoh Aficio Color 6513 system, are often designed to provide a variety of functions. For example, a printing device may be designed to offer collating, punching, and/or stapling functions. By invoking a print feature of an application executing on a computer, a user may instruct his computer to print a document using a selected printing device. The user may configure the print feature to instruct the selected printing device to perform selected actions, such as collating, punching, and/or stapling, relative to the document to be printed.

Usually such an application executes in the context of an operating system into which a print driver specifically designed for the selected printing device has been loaded. When a user invokes a print feature of an application, the application invokes the print driver that corresponds to the selected printing device. Because the print driver was specifically designed for the printing device, the print driver is capable of issuing, to the printing device, the commands needed to cause the printing device to perform the selected actions.

However, some applications are not constructed to invoke a print driver. Some applications are constructed, instead, to issue commands directly to a selected printing device without invoking a print driver. Such an application is often constructed so that the application is usable only in conjunction with certain printing devices that recognize the commands. Often, the same company or group of companies that provides such an application also provides the printing devices that are designed to recognize the commands issued by the application. Sometimes, the commands are non-standard commands that differ from commands recognized by existing printing devices provided by other companies.

A user might want to use such an application, but might be deterred from using the application because his existing printing device will not recognize at least some of the commands issued by the application. A user who already owns such an application might want to switch to a different printing device, but might be deterred from switching to the different printing device because the different printing device will not recognize at least some of the commands issued by the application.

Recognizing the user's quandary, a company that designs printing devices might design new printing devices in response to such applications, so that the new printing devices will recognize the commands issued by such applications. Unfortunately, soon after the company produces the new printing devices, new versions of the applications may be released. The new applications may issue new commands that the new printing devices do not recognize. This is particularly likely when the creators of the new applications desire that the new applications will be incompatible with the new printing devices.

When a printing device fails to recognize a command, the printing device may fail to perform a desired action relative to a document. Worse yet, an unrecognized command might cause a printing device to experience an error, which may prevent the printing device from printing any documents sent from an application that issues the unrecognized command.

Existing printing devices do not provide a mechanism through which the set of all commands recognized by the existing printing devices can be updated without replacing the printing device or replacing or modifying a significant element of the printing device.

Based on the foregoing, there is a need for a printing device that does not suffer from the limitations of existing printing devices.

SUMMARY OF THE INVENTION

According to one aspect of the invention, a printing device into which data conversion functionality may be installed is disclosed. Such a printing device comprises at least two modules: a first module, and a second module. The printing device receives, through the first module, an original command that is intended to cause the printing device to perform an action that is indicated by the original command. The printing device determines whether a translation module, which contains logic for translating the original command, is installed in the printing device. If the translation module is not installed in the printing device, then the printing device sends data, which indicates the original command, directly from the first module to the second module. Alternatively, if the translation module is installed in the printing device, then the printing device invokes logic in the translation module to translate the original command into one or more translated commands that will cause the printing device to perform the intended action, and sends the one or more translated-commands to the second module. According to another aspect of the invention, an analogous method is also disclosed.

BRIEF DESCRIPTION OF THE DRAWINGS

Embodiments are illustrated by way of example, and not by way of limitation, in the figures of the accompanying drawings in which like reference numerals refer to similar elements and in which.

DETAILED DESCRIPTION OF THE INVENTION

In the following description, for the purposes of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

Example Printing Device with Data Conversion Function

Figure 1:
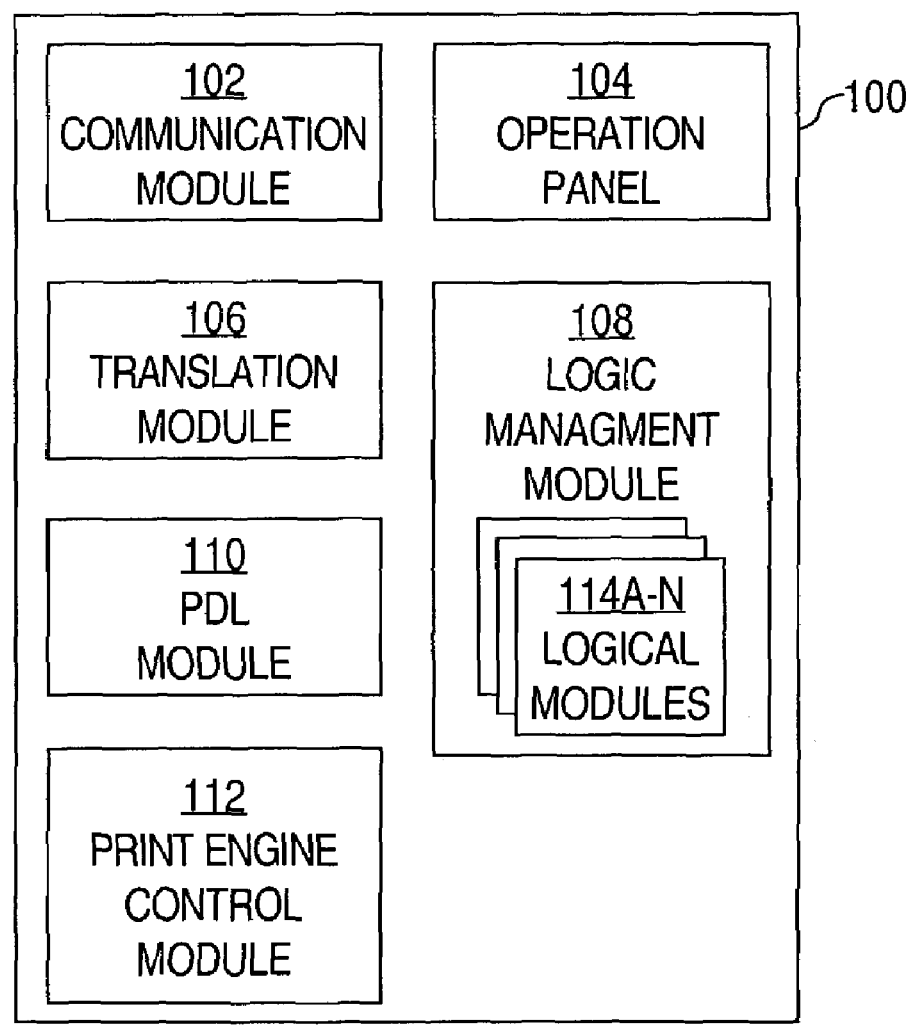
FIG. 1 is a block diagram that depicts a printing device into which-data conversion functionality has been installed, according to one embodiment of the invention.

FIG. 1 is a block diagram that depicts a printing device 100 into which data conversion functionality has been installed, according to one embodiment of the invention. Printing device 100 may be a printer, MFP, copy machine, fax machine, or any other device that can print on sheets of media such as paper or transparencies. Printing device 100 contains or is connected to multiple components. For example, printing device 100 comprises a communication module 102, an operation panel 104, a translation module 106, a logic management module 108, a printer description language (PDL) module 110, and a print engine control module 112. While components 102-112 are depicted within printing device 100, one or more of the components may be positioned externally to the printing device.

Communication module 102 allows printing device 100 to communicate with other devices, such as personal computers, workstations, and/or servers. For example, communication module 102 may transmit and receive data packets according to data link layer, network layer, and transport layer protocols, such as Ethernet, Internet Protocol (IP); and Transmission Control Protocol (TCP). Thus, communication module 102 may comprise an Ethernet adapter through which printing device 100 communicates with a network such as a local area network (LAN) or wide area network (WAN). Additionally or alternatively, communication module 102 may comprise a Universal Serial Bus (USB) port, a parallel port, a serial port, or a small computer system interface (SCSI) port, through which printing device 100 may be connected directly with devices such as those listed above.

Printing device 100 receives incoming data through communication module 102. Such incoming data may describe, for example, documents to be printed by printing device 100, control signals to cause the printing device to respond to the sender of the incoming data, or other kinds of data. Incoming data that describes documents to be printed may be called "print data."

Communication module 102 is coupled communicatively to PDL module 110 and logic management module 108. If translation module 106 is installed in printing device 100 as depicted, then communication module 106 is also coupled communicatively to translation module 106. Communication module 102 sends incoming data to translation module 106 if the translation module is installed. If translation module 106 is not installed, then communication module 102 sends incoming data directly to PDL module 110. Logic management module 108 comprises logic for determining whether translation module 106 is installed in printing device 100.

Communication module 102 comprises logic for determining source IP addresses from header sections of received IP data packets. As used herein, "logic" includes software instructions that implement branching based on the evaluation of conditional statements; for example, "if-then-else" statements. Such conditional statements may contain logical constructs such as "AND" and/or "OR." Additionally, "logic" includes hardware circuitry that implements logical functionality. "Logic" may comprise such software exclusively of such hardware, or such hardware exclusively of such software, or such software in combination with such hardware.

Communication module 102 adds the source IP addresses to the data that is contained in the payload sections of the received IP data packets. For example, communication module 102 may add a source IP address to a job header of received print data. As a result, the identity of the source of data received through communication module 102 is preserved in the data itself.

Translation module 106 is coupled communicatively to communication module 102, logic management module 108, and PDL module 110. Translation module 106 receives data from communication module 102. Such data, as received by communication module 102, may indicate a command that is intended, by the sender of the command, to cause printing device 100 to perform an action that is indicated by the command. For example, the command may indicate that printing device 102 should input paper from a specified input tray and/or output printed pages to a specified output tray.

Translation module 106 comprises logic for determining whether such a command, without translation, actually will cause printing device 100 to perform the action that is indicated by the command. For example, translation module 106 may consult a table or list that indicates character strings that require translation. If translation module 106 does not locate any of the character strings in the command or any portion thereof, then translation module 106 may determine that the command actually will cause printing device 100 to perform the indicated action. For another example, translation module 106 may determine, based on the command and a specified algorithm, whether the command actually will cause printing device 100 to perform the indicated action. If the command actually will cause printing device 100 to perform the indicated action, then translation module 106 sends the command to PDL module 110 without invoking any translation logic.

If the command, as received by translation module 106, will not cause printing device 100 to perform the indicated action, then the translation module invokes translation logic that is implemented in selected ones of logical modules 114A-114N. The translation logic, when invoked, translates the command into one or more translated commands that will cause printing device to perform the action that is intended by the original command's sender. For example, translation module 106 may locate a character string that occurs in both the original command and a table implemented by a selected logical module. In response to locating the character string, translation module 106 may replace the occurrence of the character string in the original command with a substitute character string that is associated with (i.e., in the same row as) the located character string in the table. Translation module 106 sends the one or more translated commands to PDL module 110.

PDL module 110 is coupled communicatively to communication module 102, print engine control module 112, and, if translation module 106 is installed as depicted, the translation module. Regardless of whether PDL module 110 receives data from communication module 102 or translation module 106, PDL module 110 handles the data in the same way. Thus, beyond coupling PDL module 110 to translation module 106, the PDL module does not need to be modified in order to accommodate the translation module. The PDL module interprets the data, generates appropriate raster commands based on the data, and sends the raster commands to print engine 112. Thus, PDL module 110 comprises a raster image processor. PDL module 110 can interpret PDLs such as, for example, PostScript and Printer Control Language (PCL).

Print engine control module 112 is coupled communicatively to PDL module 110. Print engine control module 112 causes printing device 100 to perform actions specified by raster commands received from PDL module 110. For example, print engine control module 112 may cause printing device 100 to print a document using paper from a specified input tray.

As a result, a user may use a variety of different applications, each of which generate different commands, with a single printing device. Because printing device 100 translates commands that would be unfamiliar to PDL module 110 into corresponding commands that the PDL module understands, a user may use all of an application's features of an application for which the printing device actually provides a corresponding function. Because translation module 106 is implemented in printing device 100, the printing device can translate commands even if an application sends commands directly to the printing device without invoking a print driver.

Installable Translation Module

Translation module 106 can be installed in printing device 100 without altering any significant element of printing device 100. Printing device 100 functions even without translation module 106, though without the translation module, printing device 100 does not offer the translation functionality provided by the translation module. Translation module 106 can be installed and uninstalled from printing device with minimal effort.

For example, translation module 106 may be implemented in a hardware module that can be plugged into an interface exposed by printing device 100. More specifically, translation module 106 may be implemented in an Integrated Circuit (IC) Card such as a Smart Card. By inserted the IC Card into an IC card slot of printing device 100, translation module 106 is installed in the printing device. Similarly, by removing the IC Card from the IC card slot, translation module 106 is uninstalled. Thus, in certain implementations, translation module 106 is physically installable in printing device 100 without the use of screws or solder, and without opening the chassis of the printing device.

Translation module 106 also may be implemented, for example, in an in-line memory module such as a single in-line memory module (SIMM) or a dual in-line memory module (DIMM). In such hardware implementations, to determine whether translation module 106 is installed, logic management module 108 determines whether a hardware module that implements translation module 106 has been plugged into the interface provided for the hardware module.

Alternatively, translation module 106 may be implemented in software. For example, executable code that implements translation module 106 may be sent through communication module 102 and stored on a rewritable storage device of printing device 100. The rewritable storage device may be, for example, a hard disk drive, random access memory (RAM), an electrically erasable programmable read-only memory (EEPROM), or other forms of rewritable magnetic, optical, or electronic storage media.

In such software implementations, to determine whether translation module 106 is installed, logic management module 108 determines if programmatic instructions that implement the translation module exist at an expected location. For example, logic management module 108 may determine whether programmatic instructions that implement translation module 106 are stored at a specified location in a memory unit of printing device 100.

Because translation module 106 can be installed and removed from printing device 100, the printing device can be supplied, potentially at a lower cost, without the translation module. Users who will not need the translation module may use printing device 100 without translation module 106. If, at a later time, such users desire to use translation module 106, the users can install the translation module in printing device 100 without significantly altering the printing device. Translation module 106 can be upgraded or replaced without upgrading or replacing other components of printing device 100.

Furthermore, through translation module 106, data conversion functionality can be installed in printing device 100 without altering the configurations of devices other than printing device 100. No new print driver needs to be installed in order for translation module 106 to convert data into a form that will be interpreted correctly by PDL unit 110. This avoids problems, such as software conflicts, that often attend the installation of new print drivers in connection with an existing operating system.

Selectable Logical Modules

When installed as depicted, translation module 106 is coupled communicatively with logic management module 108. Logic management module 108 indicates which ones of logical modules 114A-114N are currently selected. Each of logical modules 114A-114N specifies translation logic that translation module 106 may invoke to translate or otherwise convert data. Translation logic implemented by any given logical module may differ from translation logic implemented by other logical modules.

When translation module 106 receives a command, translation module 106 invokes translation logic that is implemented by those of logical modules 114A-114N that are currently selected, as indicated by logic management module 108. Because fewer than all of available logical modules 114A-114N may be selected at a given time, translation module 106 may invoke less than all of the translation logic collectively implemented by all of the available logical modules.

Logic management module 108 is coupled communicatively to operation panel 104. Operation panel 104 comprises a display through which variable information may be indicated to a user. Logic management module 108 indicates, through the display, available logical modules 114A-114N. Through operation panel 104, a user may provide input that indicates which ones of available logical modules 114A-114N should be selected. Based on the user input, logic management module 108 indicates to translation module 106 which ones of available logical modules were selected.

Additionally, logic management module 108 may select one or more of logical modules 114A-114N for use by translation module 106 based on the data received by the translation module. For example, those of logical modules 114A-114N that specify tables that indicate a command indicated in the received data may be selected.

Furthermore, logic management module 108 may select one or more of logical modules 114A-114N for use by translation module 106 based on a source of the data received by the translation module. As described above, communication module 102 adds an identity of the source of data to the data itself. Different ones of logical modules 114A-114N may be associated with different sources. Logic management module 108 may select those of logical modules 114A-114N that are associated with a source that matches the source identified in the data.

Printing device 100 may comprise a rewritable storage device, such as a hard disk drive, that stores data in relational format, such as can be read and manipulated by a database program. Instructions and data that comprise logical modules 114A-114N may be stored in relational format on the storage device. New logical modules may be added to logical modules 114A-114N by writing such new logical modules to the storage device. Logic management module 108 may receive new logical modules through communication module 102 and include the new logical modules among logical modules 114A-114N. One or more of logical modules 114A-114N may be removed by deleting corresponding instructions and/or data from the storage device.

Because new logical modules can be added to printing device 100, the printing device can be updated to translate new commands at a time that an application that sends the new commands becomes available. Printing device 100 can evolve as quickly as the applications that send commands to the printing device, increasing the longevity and usefulness of the printing device.

Translation through String Addition and Removal

While some of logical modules 114A-114N implement translation logic that substitutes specified original character strings with corresponding specified replacement character strings, some of logical modules 114A-114N may implement translation logic that, when invoked, converts data in other ways.

For example, one or more of logical modules 114A-114N may implement translation logic that, when invoked, adds specified strings to received data without altering any strings existing in the received data. When such a logical module is selected, and translation module 106 receives data that indicates a command specified by the logical module, the translation module may translate the data by adding one or more corresponding additional commands specified by the logical module.

For another example, one or more of logical modules 114A-114N may implement translation logic that, when invoked, removes specified strings from received data without adding any strings to the received data. Such translation logic may be used to remove specified commands, or portions thereof, that are known to cause printing device 100 to experience an error, especially when such specified commands have no corresponding replacement command that printing device 100 understands.

Example Translation Logic

Translation logic implemented by logical modules 114A-114N may be in the form of a table, for example, in which an input string is specified in a first column of a row, and one or more corresponding output strings are specified in a second column of the row. Translation logic may also be in the form of an algorithm that specifies conditional statements and branching. Such tables and algorithms may be called "data filters." Some examples of translation logic that may be implemented by a logical module are provided below.

Different printing devices may identify input and output trays in different ways. For example, one printing device may designate trays, from top to bottom, as trays 1, 2, 3, and 4. Another printing device may designate trays, from top to bottom, as trays 4, 3, 2, and 1. An application might generate a command that specifies a tray identifier that, when received by printing device 100, causes the printing device to use a tray other than the one intended by the user. As a result, pages may be printed on the wrong kind of media, or a print job may be mixed, unintentionally, with other pages in an output bin.

Table 1 depicts a data filter that, when invoked by translation module 106, causes a tray identifier to be translated so that tray 4 becomes tray 1, and vice-versa.

TABLE 1

| TRAY SWITCHING DATA FILTER | |
|---|---|
| Input String/Command | Converted String |
| Input=Tray1 | Input=Tray4 |
| Input=Tray2 | Input=Tray3 |
| Input=Tray3 | Input=Tray2 |
| Input=Tray4 | Input=Tray1 |

Additionally, printing device 100 may provide a feature that, when activated, causes received data to be stored on a storage device instead of being sent to PDL module 110. While the feature is active, data stored on the storage device is not sent to PDL module 110 until a user supplies a recognized code through operation panel 104. Despite printing device 100 providing the feature, some applications might not send the command required to activate the feature.

Selecting a particular logical module causes translation module 106 to add, to received data, the command required to activate the feature. For example, translation logic implemented by the particular module may identify a string that indicates a print job header. When invoked by translation module 106, the translation logic adds, to the print job header, a command that causes printing device 100 to activate the feature.

Furthermore, printing device 100 may provide a feature that allows only data from certain specified sources to be sent to PDL module 110. Printing device 100 may provide a feature that prevents data from certain specified sources from being send to PDL module 110. Different ones of logical modules 114A-114N may indicate different sources, whether data being sent from those sources should be sent to or blocked from PDL module 110, and whether data sent from other unspecified sources generally should be sent to or blocked form the PDL module.

For example, a particular logical module may implement translation logic that specifies that data sent from either IP address "172.30.2.100" or IP address "172.30.2.101" should not be sent to PDL module 110. The translation logic may specify that data sent from all other IP addresses should be sent to PDL module 110. Such translation logic indicates the required commands that should be added to data to cause printing device to allow or block the specified IP addresses.

IP addresses may be added to or removed from the set of specified IP addresses indicated by a particular logical module. For example, printing device 100 may receive one or more specified IP addresses through communication module 102, and, in response to receiving the specified addresses, modify the translation logic indicated by the particular logical module to either include or exclude the specified IP addresses.

Additionally, printing device 100 may provide a feature that, when activated, causes a pattern to be overlaid on printed pages. The pattern is designed to be more perceptible to the human eye on a photocopy of the printed page than on the original printed page. While the feature is active, received data is modified so that the pattern is indicated in the data in addition to the existing data. The modified data is sent to PDL module 110. Such a feature helps prevent the photocopying of documents that are not to be duplicated, such as checks. Despite printing device 100 providing the feature, some applications might not send the command required to activate the feature.

Selecting a particular logical module causes translation module 106 to add, to received data, the command required to activate the feature. For example, translation logic implemented by the particular module may identify a string that indicates a print job header. When invoked by translation module 106, the translation logic adds, to the print job header, a command that causes printing device 100 to activate the feature.

Example Process for Converting Data

Figure 2A:
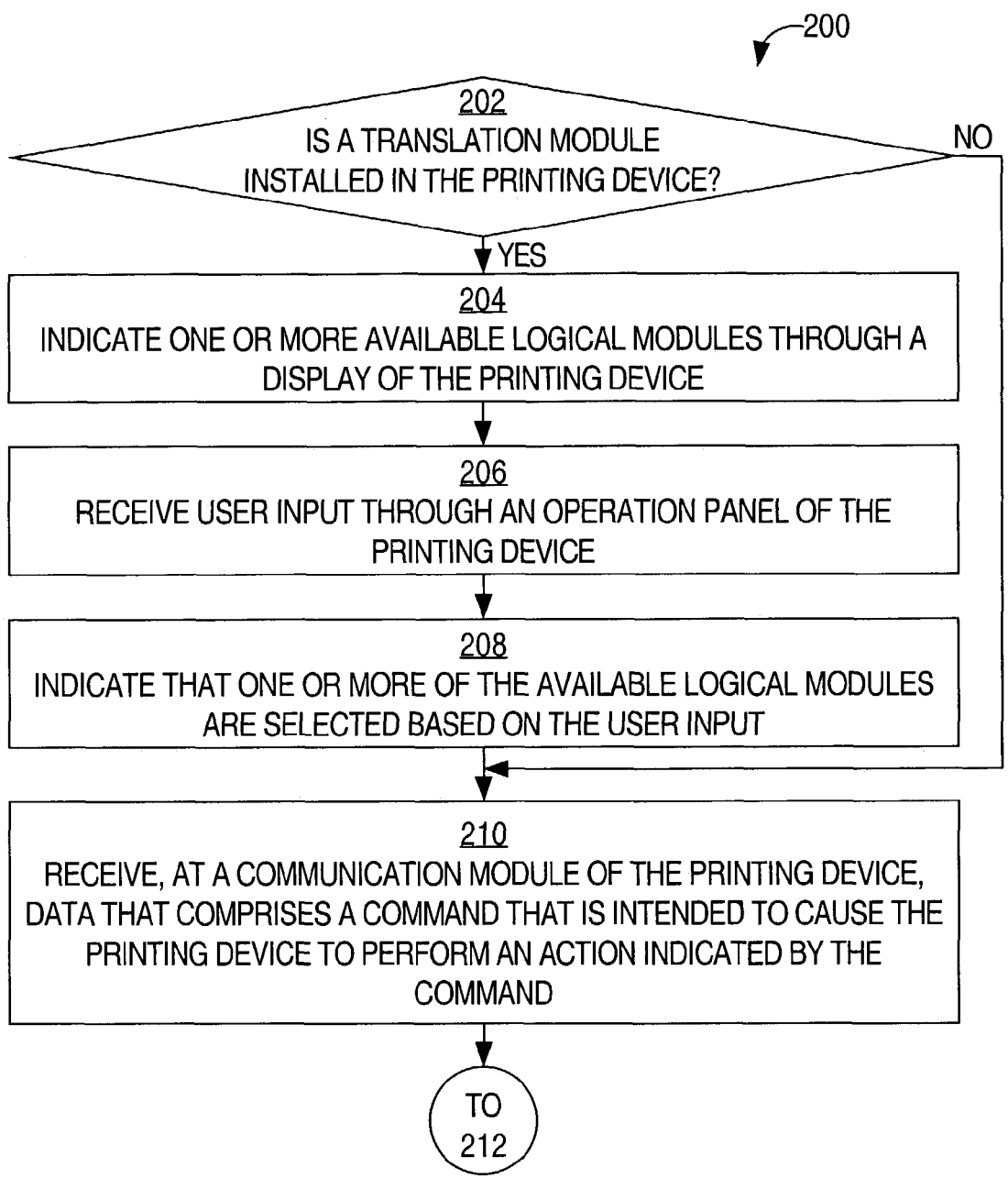
FIG. 2A and FIG. 2B are flow diagrams that depict a process for converting data received at a printing device, according to one embodiment of the invention.
Figure 2B:
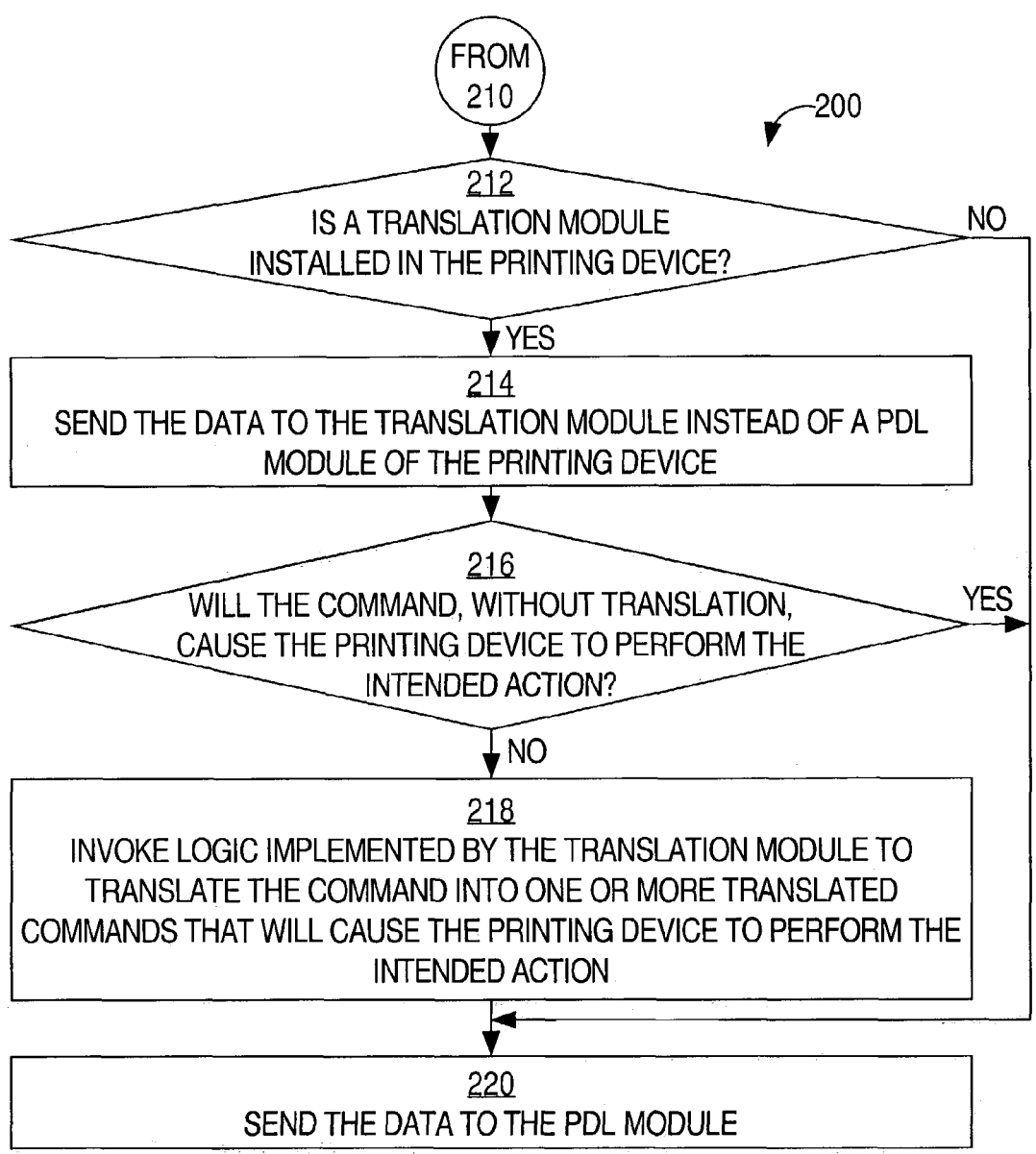

FIG. 2A and FIG. 2B are flow diagrams that depict a process 200 for converting data received at a printing device, according to one embodiment of the invention. For example, printing device 100 may perform process 200.

In block 202, it is determined whether a translation module is installed in the printing device. For example, logic management module 108 may determine, by one or more of the techniques described above, whether translation module 106 is installed in printing device 100. If the translation module is installed in the printing device, then control passes to block 204. Otherwise, control passes to block 210.

In block 204, one or more available logical modules are indicated through a display of a printing device. For example, printing device 100 may indicate, through a display of operation panel 104, that logical modules 114A-114N are available for selection. Printing device 100 may provide a brief description of the functionality implemented by each available logical module.

In block 206, user input is received through an operation panel of the printing device. For example, printing device 100 may receive user input through operation panel 104. The user input may indicate the selection of one of logical modules 114A-114N that implements logic for switching trays, as depicted in Table 1 above.

In block 208, one or more of the available logical modules are indicated as being selected based on the user input. For example, logic management unit 108 may indicate that the logical modules indicated by the user input received in block 206 are currently selected.

In block 210, data, which comprises a command, is received at a communication module of a printing device. The command is intended, by the sender of the command, to cause a printing device to perform an action indicated by the command. For example, communication module 102 may receive print data that comprises a command that is intended to cause printing device 100 to print a document using paper from a topmost tray of the printing device. The command may indicate "Input=Tray1."

In block 212, it is determined whether a translation module is installed in the printing device. For example, logic management module 108 may determine, by one or more of the techniques described above, whether translation module 106 is installed in printing device 100. If the translation module is installed in the printing device, then control passes to block 214. Otherwise, control passes to block 220.

In block 214, the data is sent to the translation module instead of a PDL module of the printing device. In block 216, it is determined whether the command, without translation, will cause the printing device to perform the intended action. For example, translation module 106 may make such a determination based on logic implemented by the ones of logical modules 114A-114N that are indicated by logic management module 108 as being selected. If the command, without translation, will cause the printing device to perform the intended action, then control passes to block 220. Otherwise, control passes to block 218.

In block 218, logic implemented by the translation module is invoked, thereby translating the command into one or more translated commands that will cause the printing device to perform the intended action. The currently selected logical modules implement the logic implemented by the translation module. For example, if a selected logical module implements the translation table depicted above in Table 1, and if the command is "Input=Tray1," then translation module 106 locates "Input=Tray1" in the first column, and translates the command into the corresponding translated command, "Input=Tray4." Translation module 106 replaces "Input=Tray1" with "Input=Tray4" in the data received in block 210.

In block 220, the data is sent to the PDL module of the printing device. If the translation module is not installed, then the data is sent directly from the communication module to the PDL module.

Implementation Mechanisms

Figure 3:
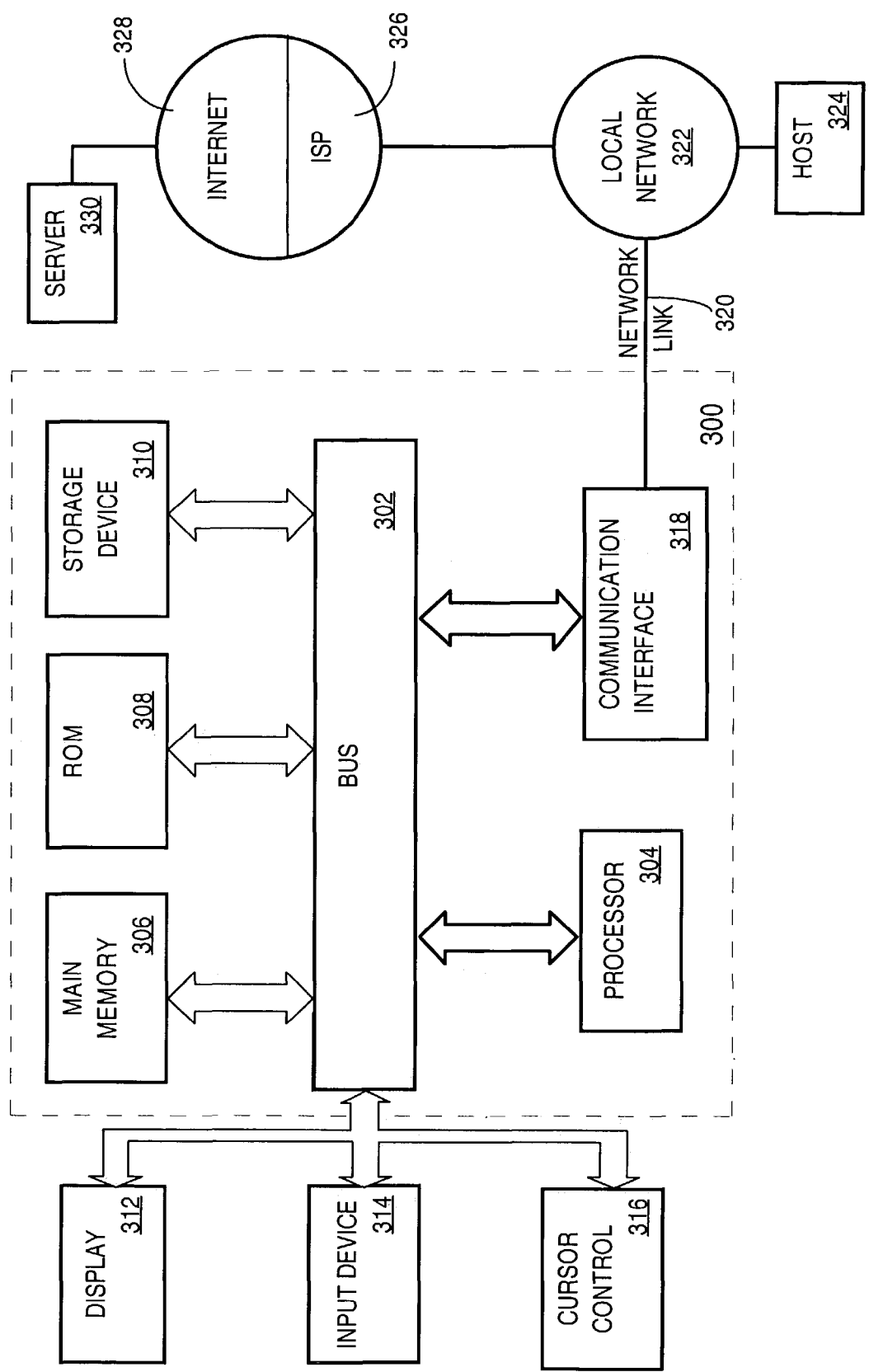
FIG. 3 is a block diagram that depicts a printing device upon which an embodiment of the invention may be implemented.

FIG. 3 is a block diagram that depicts a printing device 300 upon which an embodiment of the invention may be implemented. Printing device 300 includes a bus 302 or other communication mechanism for communicating information, and a processor 304 coupled with bus 302 for processing information. Printing device 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Printing device 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions. Management server 104 may be implemented on printing device 300.

Printing device 300 may be coupled via bus 302 to a display 312, such as a liquid crystal display (LCD), for displaying information to a user. An input device 314, including alphanumeric and other keys, is coupled to bus 302 for communicating information and command selections to processor 304. Another type of user input device is cursor control 316, such as a mouse, trackball, stylus, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of printing device 300 in a wireless communications architecture. According to one embodiment of the invention, wireless communications are provided by printing device 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector coupled to bus 302 can receive the data carried in the infrared signal and place the data on bus 302. Bus 302 carries the data to main memory 306, from which processor 304 retrieves and executes the instructions. The instructions received by main memory 306 may optionally be stored on storage device 310 either before or after execution by processor 304.

Printing device 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a LAN card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the worldwide packet data communication network now commonly referred to as the Internet 328. Local network 322 and Internet 328 both use electrical, electromagnetic or optical signals that carry digital data streams. The signals through the various networks and the signals on network link 320 and through communication interface 318, which carry the digital data to and from printing device 300, are example forms of carrier waves transporting the information.

Printing device 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application provides for configuring a monitoring system to monitor selected network elements as described herein. Processor 304 may execute the received code as it is received and/or stored in storage device 310 or other non-volatile storage for later execution. In this manner, printing device 300 may obtain application code in the form of a carrier wave.

In the foregoing specification, specific embodiments of the invention have been described. However various modifications and changes may be made to such embodiments of the invention without departing from the broader spirit and scope of the invention. The specification and drawings are, accordingly, to be regarded in an illustrative rather than a restrictive sense.

What is claimed is:

1. A printing device configured to perform steps comprising:
   receiving, at a first module of said printing device, an original command that is intended to cause said printing device to perform an action indicated by said original command;
   determining whether a translation module that implements logic for translating said original command is installed in said printing device;
   if said translation module is not installed in said printing device, then sending data that comprises said original command directly from said first module to a second module of said printing device;
   if said translation module is installed in said printing device, then performing steps comprising:
      determining whether said original command, without translation, will cause said printing device to perform said action;
      if said original command, without translation, will cause said printing device to perform said action, then sending said data to said second module; and
      if said original command, without translation, will not cause said printing device to perform said action, then performing steps comprising:
         invoking said logic of said translation module to translate said original command into one or more translated commands that will cause said printing device to perform said action; and
         sending said one or more translated commands to said second module.

2. The printing device of claim 1, wherein determining whether said translation module is installed in said printing device comprises determining whether a hardware module that implements said logic is plugged into an interface of said printing device.

3. The printing device of claim 1, wherein determining whether said translation module is installed in said printing device comprises determining whether software that implements said logic is stored on a rewritable data storage device of said printing device.

4. The printing device of claim 1, wherein said logic is implemented by one or more logical modules, and wherein the printing device is further configured to select said one or more logical modules from among a plurality of logical modules.

5. The printing device of claim 1, wherein said logic is implemented by one or more logical modules, and wherein the printing device is further configured to perform steps comprising:
receiving, through an operation panel of said printing device, user input; and
based on said user input, selecting said one or more logical modules from among a plurality of logical modules.

6. The printing device of claim 1, wherein said logic is implemented by one or more logical modules, and wherein the printing device is further configured to perform steps comprising:
receiving said data; and
based on said data, selecting said one or more logical modules from among a plurality of logical modules.

7. The printing device of claim 1, wherein said logic is implemented by one or more logical modules, and wherein the printing device is further configured to perform steps comprising:
receiving said data;
determining, from said data, a source of said data; and
based on said source, selecting said one or more logical modules from among a plurality of logical modules.

8. The printing device of claim 1, wherein said logic is implemented by one or more logical modules, and wherein the printing device is further configured to perform steps comprising:
receiving input that specifies a new logical module that is not one of said one or more logical modules;
in response to receiving said input, adding said new logical module to a plurality of logical modules; and
selecting said one or more logical modules from among said plurality of logical modules.

9. The printing device of claim 1, wherein said logic, when invoked, performs steps comprising:
determining whether said original command is indicated in a table specified by said translation module; and
if said original command is contained in said table, then replacing said original command with one or more substitute commands that are indicated in one or more rows that indicate said original command.

10. The printing device of claim 1, wherein said translated command comprises said original command and one or more additional commands.

11. The printing device of claim 1, wherein said logic, when invoked, removes one or more parts of said original command that would cause said printing device to experience an error.

12. The printing device of claim 1, wherein the printing device is further configured to perform steps comprising:
receiving one or more Internet Protocol (IP) packets that collectively indicate, in payload sections of said one or more IP packets, said data, wherein said data indicates said command but not a source of said one or more IP packets;
determining, from a header section of at least one of said one or more IP packets, a source of said IP packets; and
updating said data to indicate said source.

13. The printing device of claim 1, wherein said original command indicates a first tray of said printing device, wherein said one or more translated commands indicate a second tray of said printing device, and wherein said one or more translated commands do not indicate said first tray.

14. The printing device of claim 1, wherein said action is storing said data instead of printing said data.

15. The printing device of claim 1, wherein said action is preventing said data from being printed unless a source of said data matches at least one of one or more specified sources.

16. The printing device of claim 1, wherein said action is preventing said data from being printed unless a source of said data matches at least one of one or more specified sources, and wherein the printing device is further configured to perform steps comprising:
receiving a new specified source that is not one of said one or more specified sources; and
in response to receiving said new specified source, adding said new specified source to said one or more specified sources.

17. The printing device of claim 1, wherein said action is printing, on a same page on which said data is printed, a pattern that becomes more perceptible to human eyes when said pattern is photocopied.

18. The printing device of claim 1, wherein said logic is implemented by one or more logical modules, and wherein the printing device is further configured to indicate, through a display of said printing device, that said one or more logical modules can be selected.

19. The printing device of claim 1, wherein said action is storing said data instead of printing said data, and wherein the printing device is further configured to perform steps comprising:
receiving, through an operation panel of said printing device, user input; and
if said user input matches a specified code, then printing data that has been stored instead of printed.

20. A method comprising:
receiving, at a first module of a printing device, an original command that is intended to cause said printing device to perform an action indicated by said original command;
determining whether a translation module that implements logic for translating said original command is installed in said printing device;
if said translation module is not installed in said printing device, then sending data that comprises said original command directly from said first module to a second module of said printing device;
if said translation module is installed in said printing device, then:
determining whether said original command, without translation, will cause said printing device to perform said action;
if said original command, without translation, will cause said printing device to perform said action, then sending said data directly from said first module to said second module; and
if said original command, without translation, will not cause said printing device to perform said action, then:
invoking said logic of said translation module to translate said original command into one or more translated commands that will cause said printing device to perform said action; and sending said one or more translated commands to said second module.

21. A printing device configured to perform steps comprising:
   receiving, at a first module of said printing device, an original command that is intended to cause said printing device to perform an action indicated by said original command;
   determining whether a translation module that implements logic for translating said original command is installed in said printing device;
   if said translation module is not installed in said printing device, then sending data that comprises said original command directly from said first module to a second module of said printing device;
   if said translation module is installed in said printing device, then performing steps comprising:
      invoking said logic of said translation module to translate said original command into one or more translated commands that will cause said printing device to perform said action; and
      sending said one or more translated commands to said second module.

22. A computer-readable medium carrying one or more sequences of instructions for managing a network of two or more printers, wherein execution of the one or more sequences of instructions by one or more processors causes the one or more processors to perform the steps of:
   receiving, at a first module of said printing device, an original command that is intended to cause said printing device to perform an action indicated by said original command;
   determining whether a translation module that implements logic for translating said original command is installed in said printing device;
   if said translation module is not installed in said printing device, then sending data that comprises said original command directly from said first module to a second module of said printing device;
   if said translation module is installed in said printing device, then:
      determining whether said original command, without translation, will cause said printing device to perform said action;
      if said original command, without translation, will cause said printing device to perform said action, then sending said data directly from said first module to said second module; and
      if said original command, without translation, will not cause said printing device to perform said action, then:
         invoking said logic of said translation module to translate said original command into one or more translated commands that will cause said printing device to perform said action; and
         sending said one or more translated commands to said second module.

23. A printing device comprising:
   means for receiving, at a first module of said printing device, an original command that is intended to cause said printing device to perform an action indicated by said original command;
   means for determining whether a translation module that implements logic for translating said original command is installed in said printing device;
   means for sending data that comprises said original command directly from said first module to a second module of said printing device if said translation module is not installed in said printing device;
   means for invoking, if said translation module is installed in said printing device, said logic of said translation module to translate said original command into one or more translated commands that will cause said printing device to perform said action; and
   means for sending said one or more translated commands to said second module if said translation module is installed in said printing device.

* * * * *